March 29, 1949.   T. H. CLARK   2,465,354
OSCILLOGRAPH
Filed March 16, 1946
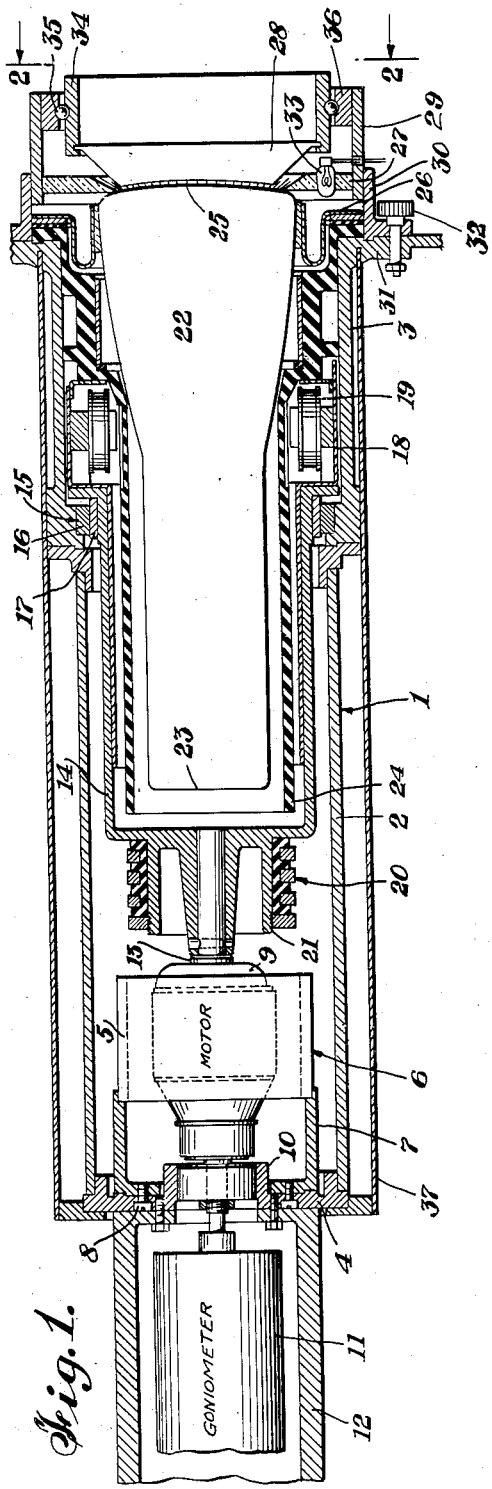
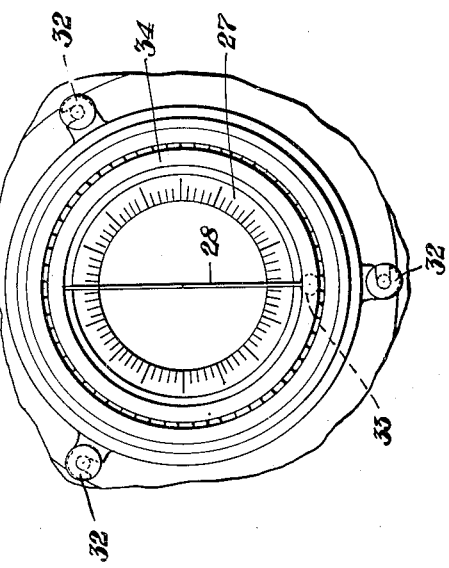
INVENTOR.
TREVOR H. CLARK
BY
R.P. Morris
ATTORNEY Patented Mar. 29, 1949

2,465,354

UNITED STATES PATENT OFFICE 2,465,354

OSCILLOGRAPH

Trevor H. Clark, Boonton, N. J., assignor to Federal Telephone and Radio Corporation, New York, N. Y., a corporation of Delaware Application March 16, 1946, Serial No. 654,847

2 Claims. (Cl. 250—141)

The present invention relates to oscillographs and particularly to the type in which magnetic coils are used to deflect the beam and the magnetic coils are rotated to produce a circular movement of the trace.

In certain uses of oscillographs of the type to which this application has reference, such as for example, in direction finding equipment, the trace is rotated synchronously with another device, such as for example, a goniometer. Frequently in such arrangements a single motor is employed to rotate both the magnetic coils and the rotatable coil of the goniometer. For certain purposes it is desirable that such equipment be portable, as for example, when employed in aircraft. Furthermore in such arrangements it is important that the motor be accurately aligned with the portion of the oscillograph carrying the rotating magnetic coils to prevent error due to angular deviation.

An object of the present invention is the provision of an improved oscillograph of the type hereinabove described.

Another object is the provision of a relatively simple compact arrangement of an oscillograph utilizing rotating magnetic coils.

Another object is the provision of an arrangement, of the type hereinabove referred to, in which accurate alignment is maintained between the rotor of the motor and the portion of the oscillograph carrying the magnetic coils.

Other and further objects of the present invention will become apparent and the invention will be best understood from the following description of an embodiment thereof, reference being had to the drawings, in which:

Fig. 1 is a longitudinal sectional view of an oscillograph embodying my invention; and Fig. 2 is an end elevational view of the oscillograph illustrated in Fig. 1.

Referring now to the drawings and particularly to Fig. 1, a frame 1 is comprised of an elongated cylindrical member 2, which is preferably of a light material such as for example aluminum, abutting a shaped member 3 generally cylindrical in structure which may be of somewhat heavier material to support certain additional parts of the oscillograph structure. At the end of cylindrical member 2 opposite member 3 there is provided an end plate 4. The end plate 4 is used to support the stator 5 of a motor 6 by means of a motor mounting 7 which may be attached to end plate 4 by any suitable means such as for example, screws 8. The motor 6 has a rotor 9, one end of which is journalled in a bearing member 10 supported within a suitable opening in end plate 4. The rotor shaft may also pass through the bearing member 10 to rotate other apparatus such as a goniometer 11 arranged within a housing 12 supported from end plate 4. The opposite end 13 of the rotor 9 is attached to a rotatable housing 14 which is journalled for rotation on only one bearing 15 mounted at a position remote from end 13, which bearing 15 may comprise a stationary self-lubricating ring 16 (e. g. "Oilite" ring) which is fixed to the shaped member 3 of the frame on which ring 16 a hardened ring 17 such as for example, a hardened steel alloy, rotates. The housing 14 is lined with a sheath 18 of a high permeability, low retentivity material which sheath 18 may be made of "Mu-metal." At the end of the housing 14, sets of magnetic deflection coils 19 are carried, with the sheath 18 running around the outside of said magnetic deflection coils 19. To provide electrical energy for the deflection coils 19, contact or slip rings 20 for making contact with stationary brushes (not shown) are mounted toward the end of the housing 14 nearest the motor, on a suitable extension 21 affixed to the housing 14, and these rings 20 are connected by suitable wires (not shown) to the deflection coils 19. A cathode ray oscillograph tube 22 has its base end 23 and a portion of its length extending within the housing 14 and supported therein and spaced from the rotating portions thereof by means of a supporting member 24 of insulating material which is supported from the shaped member 3 of the frame. The cathode ray oscillograph tube is further supported near its screen 25 by means of resilient spring fingers 26 having a yieldable material such as felt pressing against the walls of said cathode ray tube 22. Wiring (not shown) for the cathode ray tube may be laid within grooves or slots in the supporting member 24 and be brought out near the front of the oscillograph.

A suitably calibrated scale 27 and an alidade 28 are both supported from a slidable member 29 slidable longitudinally with respect to the extension of the frame 1 so as to compensate for small variations in length of the cathode ray tube, the member 29 sliding on a supporting cylindrical member 30 which is removably fastened to the flange 31 provided on member 3 of frame 1 by suitable means such as for example, thumb screws 32. The scale 27 may be made of Lucite and have a light source 33 arranged so as to throw a light around the entire scale. The scale 27 is placed directly up against the screen 25 and is provided with a central opening therein into which opening the forward end of the alidade projects.

The alidade is in the form of a thin plate which appears as a straight line when viewed in end elevation as for example, is illustrated in Fig. 2. When viewed from the side, the alidade tapers inwardly and extends within the opening formed in scale 27 so that the end of the alidade may be placed in close proximity to the front of the cathode ray tube. The alidade 28 is mounted in a cylindrical member 34 which is rotatable as for example, on bearings 35 within another cylinder 36 which is longitudinally slidable to bring the alidade in close proximity to the screen 25. By rotating the cylindrical member 34, the angular position of the alidade can be adjusted. The close proximity of the alidade to the screen and the projected shape of the alidade minimizes errors due to parallax. A dust cover 37 may be mounted about the oscillograph.

The oscillograph structure herein described is readily assembled, for example in the following manner. After the frame has been assembled, there is inserted therein a single unit including the motor 6, the motor mounting 7, the rotatable housing 14 carrying its coils 19 and the contact rings 20. This unit is secured in place by merely tightening the screws 8 to fix the motor bearing 10 to end plate 4. The cathode ray tube may be inserted and secured with its supporting member 24 and cylindrical member 30 carrying the scale and alidade may be secured to the frame by thumb screws 32.

While I have described above the principles of my invention in connection with specific apparatus, it is to be clearly understood that this description is made only by way of example and not as a limitation on the scope of my invention as defined in the accompanying claims.

I claim:

1. A cathode ray oscillograph comprising a frame, a motor mounted in said frame having its stator supported therefrom and one end of its rotor journalled therein, a rotatable housing within said frame aligned with said rotor and attached to the other end thereof for rotation therewith, said housing comprising material of a high magnetic permeability and low magnetic retentivity, a cathode ray tube projecting into said housing and a magnetic deflection coil mounted on and within said rotatable housing adjacent said cathode ray tube.

2. A cathode ray oscillograph according to claim 1 further including electrical insulating means for supporting said cathode ray tube within said rotatable housing comprising a stationary cylinder supported at one end thereof from the frame and projecting into the end of the rotatable housing farthest from the motor.

TREVOR H. CLARK.

REFERENCES CITED

The following references are of record in the file of this patent:

UNITED STATES PATENTS

| Number | Name | Date |
| --- | --- | --- |
| 1,535,329 | MacGregor-Morris et al. | Apr. 28, 1925 |
| 2,165,779 | Blain | July 11, 1939 |
| 2,330,604 | Messner | Sept. 28, 1943 |
| 2,343,630 | Atwood, Jr. | Mar. 7, 1944 |
| 2,389,995 | Packer | Nov. 27, 1945 |